United States Patent [19]

Hart et al.

[11] 4,418,799

[45] Dec. 6, 1983

[54] COMBINED AIR RESERVOIR/BRAKE CYLINDER DEVICE

[75] Inventors: James E. Hart, Trafford; Willard P. Spalding, Penn Hills; Allen W. Kyllonen, Plum, all of Pa.

[73] Assignee: American Standard Inc., Wilmerding, Pa.

[21] Appl. No.: 290,756

[22] Filed: Aug. 7, 1981

[51] Int. Cl.³ .............................................. B60T 11/10
[52] U.S. Cl. ................................. 188/153 R; 92/245; 303/35
[58] Field of Search ........................ 92/64, 240, 245; 188/153 R, 153 D; 303/35, 38

[56] References Cited

U.S. PATENT DOCUMENTS

| | | | |
|---|---|---|---|
| Re. 30,408 | 9/1980 | Hart | 303/35 |
| 3,318,202 | 5/1967 | Means | 92/245 |
| 4,225,193 | 9/1980 | Hart | 303/35 |
| 4,339,155 | 7/1982 | Hart | 303/38 |

*Primary Examiner*—Duane A. Reger
*Attorney, Agent, or Firm*—G. J. Falce

[57] ABSTRACT

A pneumatic brake cylinder device employs a pair of different sized fluid motors, the pressure chambers of which serve as air storage reservoirs. The cylinder of the larger fluid motor is formed by the main casting and contains a larger piston, while the cylinder of the smaller fluid motor is mounted to the main casting in coaxial relationship with the larger cylinder and contains a smaller piston having an elongated hollow body that is connected at its open end to one side of the larger piston to form a pressure chamber therebetween. The smaller piston fits within the smaller cylinder in spaced-apart relationship therewith to form a pressure chamber delimited by a seal fixed on the main casting for engagement with the piston periphery at any point along its longitudinal axis. The larger piston cooperates with the larger cylinder to form pressure chambers on opposite sides thereof.

The arrangement provides for a design employing fewer seals and a simplified main casting in which all the passages to the respective pressure chambers are contained.

43 Claims, 1 Drawing Figure

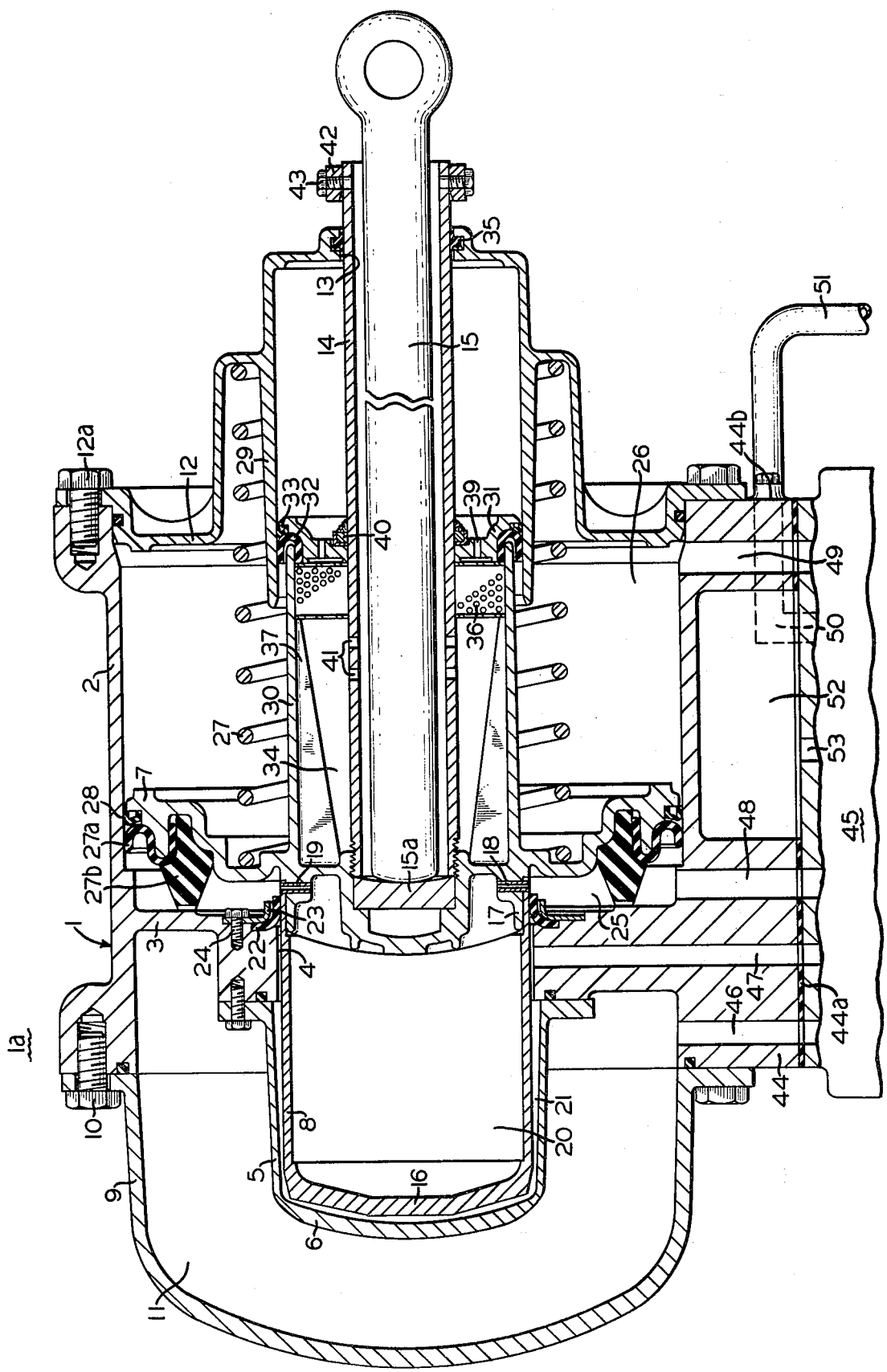

COMBINED AIR RESERVOIR/BRAKE CYLINDER DEVICE

BACKGROUND OF THE INVENTION

U.S. Pat. No. Re. 30,408, reissued Sept. 30, 1981, to the assignee of the present application, discloses railway brake appratus including a brake cylinder device and a control valve device. The usual air reservoirs associated with conventional pneumatic brake equipment are eliminated in the disclosed apparatus in favor of storing the compressed air within the brake cylinder device itself. The brake cylinder device embodies a pair of tandem-connected pistons of unequal diameter, the larger piston cooperating with the brake cylinder body to form on the respective opposite sides of this piston two chambers that are charged with compressed air via the train brake pipe, and in which chambers the air required for use by the brake apparatus, including the brake cylinder device, is stored. The aforementioned control valve device operates in response to variations in the train brake pipe pressure to control the transfer of air stored in the brake cylinder device, so as to develop differential forces across the respective pistons thereof, and thereby effect a brake application and brake release.

In addition to the typical packing cup type pressure seals associated with the respective pistons of this brake cylinder device, there are several additional areas in which dynamic sealing is required, all of which are critical in the sense that leakage thereat affects the desired operation of the brake cylinder device.

Further, passageways are required in the body of the brake cylinder device to conduct pressure between the control valve device and brake cylinder operating components. It is well known that the expense in the manufacture of a casting increases with the complexity in the configuration of these passages, as well as in the shape of the casting itself.

SUMMARY OF THE INVENTION

It is an object of the present invention to provide an improved brake cylinder device of the combined brake cylinder and air reservoir type, in which the construction of the brake cylinder device is such as to reduce the number of dynamic seals heretofore required, in order to reduce the cost of the brake cylinder device and further to attain improved operating reliability and service life with less maintenance.

Another object of the invention is to design the brake cylinder device to employ a simplified main body casting to which the brake cylinder control valve device may be directly mounted and in which all of the passages conducting fluid pressure between the control valve device and the brake cylinder pressure chambers are contained.

In accordance with a preferred embodiment of the present invention, the brake cylinder device comprises a main body, which may be a casting in which is formed a first cylinder having opposite end walls, each with an opening therein. Connected to the main body casting about the opening in the one end wall of the first cylinder is a second smaller cylinder that is closed at one end and is coaxial with the first cylinder. A larger and a smaller piston abutment is operatively disposed in the respective first and second cylinders. The larger piston abutment includes a hollow piston rod that extends through the opening in the other end wall of the first cylinder, thus admitting atmospheric pressure to the area of the larger piston within the area of the hollow piston rod. The first cylinder is separated by the larger piston abutment into first and second chambers in which fluid under pressure is normally stored. The smaller piston abutment is provided with an elongated body that extends through the opening in the one end wall of the first cylinder for connection with the larger piston abutment, so as to from a dual-connected piston assembly. Being so connected to the larger piston abutment, which is guidably supported in the first cylinder, the smaller piston abutment is arranged in the second cylinder, so that an annular space is formed between the elongated body of the smaller piston abutment and the second cylinder. The annular space is delimited at one end by the pressure head of the second cylinder and at the other end by a seal fixed to the main casting at the opening in the one end of the first cylinder. This seal engages the elongated body of the smaller piston abutment where it passes through the opening for connection with the larger piston, thus providing a pressure seal between the first chamber and the annular space forming a third chamber to which air is connected from the first chamber via a control valve device to effect movement of the dual piston assembly to brake application position.

The control valve device is mounted to the brake cylinder at a mounting boss formed on the main casting. The fixed location of the seal in the main casting, and the mounting of the control valve to the brake cylinder at the main casting makes possible the use of a passage extending directly from the brake cylinder/control valve interface to the third chamber to control pressurization thereof. In addition, the other passages transmitting pressure to and from the first and second chambers via the control valve device are also contained solely in the main casting. Consequently, no passages are required in the other parts of the brake cylinder device, which is therefore more economical to build.

In addition, a second pressure seal is provided between the hollow piston rod and the opening in the other end of the first cylinder. The first and second pressure seals have equal sealing diameters, such that the atmospheric area of the larger piston within the hollow piston guide is equal to the effective pressure area of the smaller piston within the third chamber. This arrangement optimizes the sealing requirement and braking force capability.

Furthermore, the elongated body of the smaller piston abutment may be tubular, with one end closed. The open end is connected to the larger piston abutment to provide a fourth pressure chamber within the elongated tubular body and is in fluid pressure communication with the first pressure chamber. This pressure effective in the fourth chamber acts on opposite and equal pressure areas of the smaller and larger piston abutments and thus exerts no net directional force on the dual piston assembly. Consequently, an additional volume is gained for the storage of air supplied to the first chamber without any pressure force being developed on the dual piston assembly in opposition to the pressure in the third chamber urging piston movement in the brake application direction.

It is also noteworthy that this internal pressure tends to force the two piston abutments apart and this tension tends to promote favorable alignments of the dual piston axis with the cylinder axis.

BRIEF DESCRIPTION OF THE DRAWING

These and other objects and attendant advantages will appear in the following more detailed explanation of the single FIGURE drawing showing a cross-section assembly view of the brake cylinder device of the present invention.

DESCRIPTION AND OPERATION

The preferred embodiment comprising an improved brake cylinder device 1a of the present invention includes a main body member 1, which may be a casting forming a power cylinder 2 with a pressure head 3 having a central opening 4 formed therein, and a positioning cylinder 5 having an integral pressure head 6 connected, as by cap screws, to pressure head 3 of the power cylinder, so as to enclose the opening 4. Power cylinder 2 and positioning cylinder 5 are coaxially arranged to receive a dual piston assembly comprising a power piston 7 operatively disposed in power cylinder 2, and a positioning piston 8 operatively disposed in positioning cylinder 5. An end cover 9 is connected, as by cap screws 10 to the left-hand end of main casting 1, so as to surround positioning cylinder 5 and form a pressure chamber 11 therebetween. Sealingly connected to the right-hand end of main casting 1 by cap screws 12a is an end cover 12 having a central opening 13 through which a hollow rod 14 of power piston 7 projects. The connection of hollow rod 14 with power piston 7 may be by screw threads, as shown. Disposed within hollow rod 14 is a piston push rod 15 having one end pivotably engaged with an arcuately-shaped end piece 15a of power piston 7, and the opposite end projecting beyond the extremity of hollow rod 14 for connection with conventional brake apparatus.

Positioning piston 8 is in the form of an elongated, tubular body, one end being closed by a head 16 and the opposite end open. Head 16 forms on the right-hand side thereof a positioning pressure area. The open end of tubular positioning piston 8 fits over a flange 17 that projects coaxially from the left-hand face of power piston 7. Flange 17 and the open end of the positioning piston are formed with aligned holes 18 in which roll pins 19 are pressed to connect the power piston and positioning piston together for movement as an integral unit. The tubular shape of positioning piston 8, beng closed at one end, forms a hollow interior which, when connected with power piston 7, forms a pressure chamber 20 therebetween. In addition, positioning piston 8 is disposed within positioning cylinder 5 in spaced-apart relationship therewith, the space between the piston and cylinder forming a pressure chamber 21. A pressure type seal 22 is fixed to pressure head 3 of main casting 1 by means of an annular clamp ring 23 and screws 24, so as to surround opening 4 and sealingly engage the periphery of the tubular body comprising positioning piston 8. In the extreme leftward or brake release position, as shown, seal 22 engages the periphery of piston 8 near its open end and maintains constant sealing engagement therewith during rightward movement of the piston assembly toward brake application position. The continuous sealing effect of seal 22, therefore, establishes and maintains a fluid pressure seal between pressure chamber 20 and another pressure chamber 25 formed between pressure head 3 and the left-hand side of power piston 7 to thereby delimit an application pressure area of power piston 7. Pressure chamber 25, on the other hand, is in constant fluid pressure communication with pressure chamber 20, by way of the through openings of the respective roll pins 18.

Formed between the right-hand side of power piston 7 and end cover 12 is still another pressure chamber 26, which delimits a release pressure area of power piston 7. A return spring 27 is disposed in chamber 26 with one end supported by end cover 12 and the other end acting on power piston 7 to urge the power piston toward its extreme leftward or brake release position. A pressure type packing cup seal 27a is arranged on piston 7 to engage power cylinder 2 and effect a fluid pressure seal between pressure chambers 25 and 26. An annular element 27b, preferably made of a rubber or plastic material, lockingly engages piston 7 and seal 27a to secure the seal in place and to further serve as a cushion stop to establish the extreme leftward or release position of the piston assembly by engagement with pressure head 3. In order to establish fluid pressure across the entire application pressure area of piston 7, the stop abutting portion of element 27b is fluted, as shown. An annular guide ring 28, preferably of a long wearing plastic material is arranged in the periphery of power piston 7 to also engage power cylinder 2 and thereby support the power piston concentrically within the cylinder bore.

End cover 12 is further formed with an inwardly extending annular guide flange 29 in surrounding relationship with central opening 13 in end cover 12. Power piston 7 is provided with an inwardly extending annular projection 30 that lies concentrically within the annulus of guide flange 29. The end of projection 30 cooperates with an annular end plate 31 to support a pressure type packing cup seal 32, as well as an annular guide ring 33, each of which engages the inner periphery of guide flange 29. Packing cup 32 establishes a fluid pressure seal between pressure chamber 26 and an atmospheric chamber 34 formed within the annuli of the annular guide flange 29 and projection 30. Chamber 34 delimits a return pressure area on power piston 7. Guide ring 33 aids guide ring 28 in supporting the piston assembly and maintaining concentricity of pistons 7 and 8 within their respective cylinders 2 and 5 during axial movement of the piston assembly.

Within the annulus of opening 13 in pressure head 12 is a scraper ring 35 that engages the periphery of hollow rod 14. An annular filter element 36 is carried in the annular space of chamber 34 between projection 30 and hollow rod 14, with one end abutting a plurality of reinforcing ribs 37 of projection 30. The filter element 36 is held in place against ribs 37 by the end plate 31, which is provided with passages 39 therein. A lock ring 40 abuts end plate 31 and is welded or otherwise clamped to hollow rod 14 to secure the filter and end plate for movement with power piston 7 and hollow rod 14. On the left-hand side of filter element 36 is provided a plurality of holes 41 in hollow rod 14. Surrounding the external end of hollow rod 14 in spaced-apart relationship with end cover 12 is a collar 42 that is held in place by screw pins 43 that are screw-threaded in collar 42. Screw pins 43 are formed with a pin-like end adapted to enter conforming holes in the end of the hollow rod 14 to lock the collar in place.

Main casting 1 further includes mounting boss 44, one face 44a of which is adapted to receive the corresponding face of a control valve 45 or the like, which may be of the type similar to the control valve device 6 shown and disclosed in U.S. Pat. No. Re. 30,408 or similar to the control valve device disclosed in U.S. patent application, Ser. No. 195,149, both of which are assigned to the assignee of the present invention. In so arranging the brake cylinder and control valve devices as a unit assembly, external piping heretofore required between the brake cylinder and control valve devices is eliminated. A plurality of passages 46, 47, 48, and 49 extend from face 44a of mounting boss 44 directly into the respective pressure chambers 11, 21, 25, and 26. Another face 44b of boss 44 is arranged to receive a branch pipe 51 of the train brake pipe, which may be mounted to face 44b in a conventional manner. A passage 50 in boss 44 extends between the brake pipe mounting face 44b and the control valve mounting face 44a. Finally a cavity 52 is formed in boss 44 at the control valve mounting face 44a. When connected in place, control valve device 45 closes cavity 52 to form a pressure chamber to which air may be supplied via a passage 53 in control valve 45.

A train equipped with brake apparatus including a brake cylinder device in accordance with the present invention requires no external reservoirs for the storage of compressed air, thereby further eliminating a need for external piping, except a branch pipe between the train brake pipe and the car control valve device. When the train is charged, air is connected from the brake pipe and the branch pipe 51 at each car to passage 50, from where it is connected to the control valve 45 mounted on the brake cylinder at mounting boss 44. Control valve 45 is conditioned by the increase of brake pipe pressure to charge via passages 46, 48, and 49 the various chambers 11, 25, and 26 of the brake cylinder device, which chambers are utilized for the storage of air, as well as for providing pneumatic braking power.

The effective area of power piston 7 subject to the pneumatic pressure in chamber 26 is equal to the effective area of piston 7 subject to the pneumatic pressure in chamber 25. With both chambers 25 and 26 being charged to the same pressure, that is, the pressure of the brake pipe, there is consequently no net pneumatic pressure force exerted on the brake cylinder piston assembly in either direction due to the charging of chambers 25 and 26. Chamber 20 provides an additional volume into which the air stored in chamber 25 can flow via the communication provided by the conventional through passages in the several roll pins 19. This pneumatic pressure in chamber 20 likewise exerts no net force on the piston assembly, due to the opposing effective pressure areas of the respective positioning piston 8 and power piston 7 subject to the pneumatic pressure in chamber 20 being equal, so that the forces counteract. Accordingly, return spring 27 is effective to force the piston assembly to its leftward-most position in which cushion stop 27a engages pressure head 3, thereby establishing brake release position of the respective positioning and power pistons comprising the dual piston assembly.

At this point, it should be noted that the arrangement of the present invention eliminates the need for a dynamic seal to isolate the pneumatic pressure in chamber 25 from the right-hand side of the positioning piston, as required in the arrangement disclosed in the aforementioned Reissue U.S. Pat. No. Re. 30,408 and U.S. patent application, Ser. No. 195,149. This is accomplished by connecting the power piston so that the leftward-acting force of pressure in chamber 20 acting on the positioning piston is balanced by a counteracting force of pressure in chamber 20 acting on the power piston.

When a brake application is desired, brake pipe pressure is reduced in a well-known manner, in response to which the car control valve device 45 operates to transfer air stored in chamber 26 to chamber 21 via passages 49 and 47. It will be appreciated that the tubular-shaped positioning piston 8, in addition to providing an annular space between it and the positioning cylinder to form chamber 21, also permits pressure seal 22 to be mounted on the main casting 1 for continuous engagement with the tubular positioning piston throughout the length of its stroke. This, in turn, permits passage 47 in main casting 1 to enter the annular space comprising chamber 21 at a location just adjacent seal 22, in order to effect pressurization of chamber 21. Accordingly, passage 47 may be formed entirely within main casting 1, so as to enter chamber 21 directly from the face 44a of boss 44. This represents a significant improvement over the aforementioned arrangement disclosed in U.S. Pat. No. Re. 30,408, wherein the design of the positioning piston and location of the piston seal requires a complex design and additional sealing to provide a passage to the positioning cylinder in order to pressurize the face of positioning piston 8.

Pressurization of chamber 21 with the pneumatic pressure stored in chamber 26 develops sufficient force on positioning piston 8 to overcome the opposing force of return spring 27 and force the dual piston assembly to move in a rightward direction to brake application position. In order to accommodate this movement of the piston assembly, the control valve operates to allow the air in the reducing volume of chamber 26 to equalize into the expanding volume of chambers 25 and 21 via passages 49 and 48.

In brake application position of the dual piston assembly, the volume of chamber 26 is minimized and the control valve operates to terminate the transfer of air from chamber 26 to chamber 21, while concurrently venting the air from chamber 26 in proportion to the reduction of brake pipe pressure. Accordingly, a pressure differential is established across power piston 7 to exert an increased force on the dual piston assembly, in addition to the force already exerted by the pressure on positioning piston 8, to obtain the desired braking force. The maximum pressure reduction in chamber 26 is limited to a predetermined value by the control valve during a service brake application, thereby establishing a maximum brake force during a full service brake application.

During an emergency brake application, the brake pipe reduction occurs at a rate that is greater than the rate of reduction during a service application. This emergency rate of brake pipe reduction is sensed by the control valve, which operates to completely vent the air in chamber 26 of the brake cylinder device and to concurrently connect the air in chamber 11 to chamber 21 via passages 46 and 47, whereby the pressure in chambers 11 and 21 essentially equalize. Accordingly, the pressure in chamber 11 acting on positioning piston 8 increases during an emergency application concurrently with an increased pressure differential created across power piston 7 to thereby cause the dual piston assembly output force during an emergency brake application to exceed the maximum output force capable of being generated during a full service brake application.

In applying the brakes during either a service or emergency brake application, it will be appreciated that the volume of the positioning cylinder is increased to a nominal value of only 140 cu. in., due to the relatively small area of positioning piston 8, so that only a small amount of air is required to take up the brake rigging slack during movement of the dual piston assembly to brake application position.

It will be further appreciated, that in effecting movement of the piston assembly to brake application position, the volume of air in chamber 26 is decreased to a nominal value of 350 cu. in., so that in subsequently providing output brake force by venting chamber 26, the loss of air is minimal.

Thus, the maximum air loss during a service brake application is limited to the combined volume of air in chambers 11 and 26 in application position of the dual brake assembly, and is only slightly more during emergency. The pneumatic efficiency of this type brake cylinder device requires such a small amount of air, therefore, that the brake cylinder device itself can be used to store the necessary compressed air without increasing the overall size of the brake cylinder relative to conventional single piston brake cylinders or adding separate reservoir volumes. In accordance with the present invention, the design of this highly efficient brake cylinder device is further improved by minimizing the required number of dynamic pressure seals and simplifying the construction, particularly as to the main casting which contains all the passages 46, 47, 48, 49, and 50.

During a release of either a service or emergency application, brake pipe pressure is increased, such increase being sensed by the control valve, which operates to exhaust the pressure in chamber 21 via passage 47 while recharging chambers 11, 25, and 26, as previously explained, to reestablish a force balance across the piston assembly and thereby allow return spring 27 to move the piston assembly leftward to brake release position.

During the aforementioned application and release braking cycle, movement of the power piston projection 30 and pressure seal 32 within guide flange 29, and movement of the power piston hollow rod 14 within opening 13 of end cover 12 produces a pumping action, by which means the air in atmospheric chamber 34 is expelled and drawn in alternately via holes 41 and the open end of hollow rod 14 leading to atmosphere. Air within atmospheric chamber 34 is consequently forced through filter element 36 to prevent the accumulation of dirt on the area of guide flange 29 with which seal 32 is engageable, thereby improving the reliability and extending the service life of seal 32. Scraper ring 35 further acts in a well-known manner to clean the surface of hollow rod 14 of any dirt accumulated thereon when the hollow rod is extended during brake applications, thereby further preventing the entry of dirt and foreign material into chamber 34.

When maintenance or repair service is required, the dual piston assembly may be removed from main casting 1 with end cover 12, as an integral unit by removing cap screws 12a. As the cap screws are unscrewed, end cover 12 is forced by spring 27 apart from its sealed connection with main casting 1 until the end cover at opening 13 engages the hollow rod collar 42, thereby caging spring 27. The dual piston assembly is then able to be removed with end cover 12 to facilitate servicing.

Although the foregoing preferred embodiment has been described as employing two interconnected pistons of different sized cylinders, it is readily apparent that the two pistons may take the shape of a single piston having different pressure areas constituting the two pistons 7 and 8.

For example, an alternate embodiment of the invention contemplates an actuator assembly in which three dynamic pressure seals are arranged between the body of a single cylinder and a single piston of the brake cylinder device. The first seal separates the cylinder into an application portion and a release portion on opposite sides of the piston. The second seal acts between the cylinder and a sleeve-like projection on one side of the piston to separate the application portion into an application chamber and a positioning chamber. The application chamber delimits a first pressure area on the one side of the piston and the positioning chamber delimits a second pressure area also on the one side of the piston. The sleeve-like projection may be closed at its end, in which case the area of the closed end constitutes the second pressure area and the chamber within the sleeve-like projection is communicated with the application chamber. The third seal acts between the cylinder and a push rod of the piston to form a release chamber that delimits a third pressure area on the other side of the piston that is preferably equal to the first pressure area on the one side of the piston, in order to maintain the piston pressure balanced by fluid normally stored in the application and release chambers in release portion of the piston. The push rod may be hollow to form a return chamber on the same side of the piston as the release chamber. This return chamber delimits a fourth pressure area on this same side of the piston that is preferably equal to the second pressure area on the one side of the piston.

Having thus described the invention, what we claim as new and desire to secure by Letters Patent, is:

1. A fluid pressure actuator device comprising:
   (a) a cylinder including application and release portions;
   (b) a piston slidably operable in said cylinder between application and release positions, said piston including a push rod having one end engageable with said piston and the other end arranged to operate working apparatus;
   (c) first seal means engaging said piston and said cylinder for separating said cylinder into said respective application and release portions on opposite sides of said piston;
   (d) second seal means for separating said application portion into an application chamber that delimits an application pressure area on one side of said piston and a positioning chamber that delimits a positioning pressure area of said piston on the same side thereof as said application pressure area;
   (e) third seal means for forming a release chamber in said release portion of said cylinder that delimits a release pressure area of said piston on the side opposite said one side and for establishing a return pressure area on said opposite side of said piston external to said release chamber;
   (f) means for introducing fluid under pressure to said release chamber to urge said piston toward said release position;
   (g) means for introducing fluid under pressure to said application chamber to urge said piston toward said application position; and
   (h) means for introducing fluid under pressure to said positioning chamber to urge said piston toward said application position.

2. A fluid pressure actuator as recited in claim 1, further comprising means for urging said piston toward said release position.

3. A fluid pressure actuator as recited in claim 1, wherein the effective areas of said application and release pressure areas are generally equal.

4. A fluid pressure actuator as recited in claim 3, further comprising spring means for urging said piston toward said release position.

5. A fluid pressure actuator as recited in claim 1, wherein the effective areas of said return pressure area and said positioning pressure area are generally equal.

6. A fluid pressure actuator as recited in claim 1, wherein said second and third seal means are annular dynamic pressure seals having generally equal sealing diameters.

7. A fluid pressure actuator as recited in claim 1, wherein a cylindrical portion is formed on said one side of said piston and projects axially therefrom, said second seal means being an annular dynamic seal fixed on said application portion of said cylinder so as to engage said cylindrical portion of said piston along the periphery thereof during movement of said piston between said application and release positions.

8. A fluid pressure actuator as recited in claim 7, wherein said cylindrical portion of said piston is tubular in shape.

9. A fluid pressure actuator as recited in claim 8, wherein said cylindrical portion is closed on the projecting end and said projecting end provides said positioning pressure area of said piston.

10. A fluid pressure actuator as recited in claim 9, wherein said tubular-shaped cylindrical portion forms a hollow chamber, said hollow chamber being in fluid communication with said application chamber.

11. A fluid pressure actuator as recited in claim 10, wherein the effective pressure area of said closed end of said cylindrical portion within said hollow chamber is equal to the effective pressure area of said one side of said piston within said hollow chamber.

12. A fluid pressure actuator as recited in claim 1, wherein said first, second, and third seal means comprise dynamic pressure seals.

13. A fluid pressure actuator as recited in claim 1 wherein said push rod comprises a tubular member that extends from said opposite side of said piston toward said release portion of said cylinder, and said third seal means is an annular dynamic seal engageable with said release portion of said cylinder and said tubular member of said push rod.

14. A fluid pressure actuator as recited in claim 13 wherein said tubular member of said push rod provides an atmospheric chamber within the annulus thereof that delimits said return pressure area on said piston, said push rod further comprising:
 (a) a hollow rod disposed within said atmospheric chamber, said hollow rod being connected at one end thereof to said opposite side of said piston and having the other end projecting through an opening in said release portion of said cylinder, and
 (b) a solid push rod disposed within the annulus of said hollow rod, said solid push rod at one end thereof having abutting engagement with said opposite side of said piston.

15. A fluid pressure actuator as recited in claim 7, wherein said cylinder further comprises:
 (a) a mounting boss having a face portion, and
 (b) said application portion of said cylinder having said fixed seal cooperating with said cylindrical portion of said piston to form an annular chamber between said positioning chamber and said application chamber, and said means for introducing fluid under pressure to said positioning chamber includes at least one straight passage opening at one end at said face portion and opening at the other end thereof into said annular chamber on the side of said fixed seal adjacent said positioning chamber.

16. A fluid pressure actuator device comprising:
 (a) a first hollow cylindrical member having first and second end walls, each said end wall having an opening therethrough;
 (b) a second hollow cylindrical member having one end closed and the other end open, said second cylindrical member being mounted at said open end thereof to said first end wall in surrounding relationship with said opening therethrough;
 (c) a first piston abutment operably disposed within said first cylindrical member and cooperating with said first end wall to form a first pressure chamber on one side of said first piston abutment in which fluid under pressure is normally stored, said first piston abutment including means projecting through said opening in said second end wall for forming, in cooperation with said second end wall, a second pressure chamber on the other side of said first piston abutment, in which said second chamber fluid under pressure is normally stored, said other side of said first piston abutment without said second pressure chamber being subject to atmospheric pressure;
 (d) a second piston abutment operably disposed within said second hollow cylindrical member so as to form in cooperation therewith a third pressure chamber between said closed end of said second cylindrical member and one side of said second piston abutment, said second piston abutment being connected with said first piston abutment at said one side thereof;
 (e) first seal means for providing a fluid pressure seal between said first and third pressure chambers; and
 (f) second seal means in said opening in said second end wall for providing a fluid pressure seal between said second pressure chamber and atmosphere, said first and second seal means having sealing faces of equal diameter, whereby the effective pressure area of said one side of said second piston abutment is generally equal to the effective area of said other side of said first piston abutment subject to said atmospheric pressure.

17. A fluid pressure actuator device, as recited in claim 16, wherein there is formed a fourth pressure chamber between the other side of said second piston abutment and said one side of said first piston abutment, said fourth pressure chamber having fluid pressure communication with said first pressure chamber.

18. A fluid pressure actuator device, as recited in claim claim 17, wherein said one side of said first piston abutment within said fourth chamber and said other side of said second piston abutment have generally equal effective pressure areas.

19. A fluid pressure actuator device, as recited in claims 16, 17, or 18, wherein said second piston abutment is cylindrical.

20. A fluid pressure actuator device, as recited in claim 17, wherein said second piston abutment comprises an elongated tubular body with one end projecting through said opening in said first end wall for connection with said first piston abutment and the other end closed to form said fourth chamber within said tubular body.

21. A fluid pressure actuator device, as recited in claim 20, wherein said tubular body cooperates with said second cylindrical member and said opening in said first end wall to form an annular space comprising at least a portion of said third chamber, said annular space being delimited by said first seal means.

22. A fluid pressure actuator device, as recited in claim 21, wherein said first seal means is fixed on said first end wall about said opening therethrough for effecting sealing engagement with said tubular body to provide said fluid pressure seal between said first and third chambers.

23. A fluid pressure actuator device, as recited in claim 22, further comprising a main body in which is formed said first cylindrical member integral with said first end wall, said main body further forming a mounting boss having a first face portion and a passage, one end of said passage opening at said first face portion and the other end of said passage opening into said annular space at said opening in said first end wall.

24. A fluid pressure actuator device, as recited in claim 23, wherein said passage opens into said annular space at a point adjacent said first seal means on the same side thereof as said third chamber.

25. A fluid pressure actuator device, as recited in claim 20, further comprising:
  (a) said first piston abutment having a flange extending from said one side of said first piston abutment into said tubular body of said second piston abutment; and
  (b) pin means for securing said tubular body of said second piston abutment to said flange to provide said connection between said first and second piston abutments.

26. A fluid pressure actuator device, as recited in claims 17 or 24, wherein said second end wall includes an annular guide flange formed about said opening in said second end wall and extending into said second chamber, and said projecting means comprises:
  (a) said first piston abutment having an annular projection extending from said other side thereof through said opening in said second end wall, in telescopic relationship with said annular guide flange, said annular guide flange and said annular projection forming a fifth chamber within the annulus thereof, said fifth chamber being open to atmosphere via said opening in said second end wall; and
  (b) said second seal means being provided between said annular guide flange and said annular projection for effecting said fluid pressure seal between said second chamber and atmosphere.

27. A fluid pressure actuator device, as recited in claim 26, wherein said projecting means further comprises rod means projecting through said opening in said second end wall for connection with a brake apparatus, said rod means including:
  (a) a hollow rod member having one end connected to said other side of said first piston abutment within said fifth chamber, the other end projecting through said opening in said second end wall, and at least one breather port in the wall of said hollow rod member via which said fifth chamber is vented to atmosphere; and
  (b) a piston push rod disposed within said hollow rod member with one end thereof abutting said other end of said first piston abutment and its other end projecting from within said hollow rod member to provide for said connection of said rod means with said brake apparatus.

28. A fluid pressure actuator device, as recited in claim 27, further comprising a filter mounted in the annular space between said hollow rod member and said annular projecting member of said first piston abutment.

29. A fluid pressure actuator device, as recited in claim 27, further comprising:
  (a) a return spring in said second chamber between said first piston abutment and said second end wall, said second end wall being removably secured to said first cylinder; and
  (b) stop means on the outer periphery of said hollow rod member external of said second end wall for caging said return spring during removal of said second end wall from said first cylinder member to permit removal of said piston abutments and said second end wall as a unit.

30. A fluid pressure actuator device, as recited in claim 23, further comprising a cover member fixed to said main body so as to enclose said second cylinder in spaced relationship therewith to provide a fifth chamber in which fluid under pressure is normally stored.

31. A fluid pressure actuator device comprising:
  (a) a main body including
    (i) a first cylinder with first and second end walls, each said end wall having an opening therethrough;
    (ii) a seal fixed in said opening of said first end wall; and
    (iii) a mounting boss having a first face portion and a first passage with one end of said first passage opening at said first face portion;
  (b) a second cylinder having one end closed and the other end open, said second cylinder being mounted at said open end to said first end wall in surrounding relationship with said opening thereof;
  (c) first and second piston abutments operably disposed in the respective first and second cylinders, said first piston abutment including rod means projecting through said opening in said second end wall for connection with a brake device;
  (d) said first piston abutment cooperating with said first end wall to form a first pressure chamber between said first end wall and one side of said first piston abutment, and with said second end wall to form a second pressure chamber between said second end wall and the other side of said first piston abutment, said first and second chambers being normally stored with fluid under pressure;
  (e) said second piston abutment having an elongated body projecting through said opening in said first end wall for connection with said one side of said first piston abutment, said elongated body cooperating with said second cylinder and with said opening in said first end wall to form an annular space comprising a third pressure chamber, whereby said seal is engageable with the periphery of said elongated body to effect a fluid pressure seal between said first and third chambers; said first passage having its other end opening into said annular space at said opening in said first end wall adjacent said annular seal on the same side thereof as said third chamber.

32. A fluid pressure actuator device, as recited in claim 31, wherein said elongated body is cylindrical in shape.

33. A fluid pressure actuator device, as recited in claim 31, further comprising a cover member fixed to said main body in surrounding, spaced-apart relationship with said second cylinder to provide a fourth chamber in which fluid under pressure is normally stored.

34. A fluid pressure actuator device, as recited in claim 33, wherein said mounting boss further includes second, third, and fourth passages having one end opening at said first face portion and the other end opening into said first, second, and fourth chambers, respectively.

35. Brake apparatus comprising:
 (a) a brake cylinder device including
  (i) a main body having
   (1) a first cylinder with first and second end walls, each said end wall having an opening therethrough;
   (2) a seal fixed in said opening of said first end wall; and
   (3) a mounting boss having first and second face portions; and a first, second, third, and fourth passage, each said passage having one end opening at said first face portion;
  (ii) a second cylinder having one end closed and the other end open, said second cylinder being mounted at said open end to said first end wall in surrounding relationship with said opening thereof;
  (iii) first and second piston abutments operably disposed in the respective first and second cylinders, said first piston abutment including rod means projecting through said opening in said second end wall for connection with a brake device;
  (iv) said first piston abutment cooperating with said first end wall to form a first pressure chamber between said first end wall and one side of said first piston abutment, and with said second end wall to form a second pressure chamber between said second end wall and the other side of said first piston abutment, said first and second chambers being normally stored with fluid under pressure,
  (v) said second piston abutment having an elongated body projecting through said opening in said first end wall for connection with said one side of said first piston abutment, said elongated body cooperating with said second cylinder and with said opening in said first end wall to form an annular space comprising a third pressure chamber whereby said seal is engageable with the periphery of said elongated body to effect a fluid pressure seal between said first and third chambers; and
  (vi) said first, second and third passages having their other end opening into said first, second and third chambers, respectively, and said fourth passage having its other end opening at said second face portion;
 (b) a fluid pressure conduit connected to said mounting boss at said second face portion to conduct fluid pressure to and from said fourth passage; and
 (c) valve means mounted to said brake cylinder device at said first face portion for controlling the flow of fluid pressure via said first, second, and third passages in response to variation of fluid pressure in said conduit.

36. Brake apparatus as recited in claim 35, further comprising:
 (a) a return spring acting on said other side of said first piston abutment to urge movement thereof toward a brake release position;
 (b) said one and said other sides of said first piston abutment having equal effective pressure areas subject to the fluid under pressure stored in said first and second chambers; and
 (c) said valve means being operative in response to charging of said fluid pressure conduit for venting said third passage and for establishing fluid pressure communication of said fourth passage with said first and second passages to provide said supply of fluid under pressure stored in said first and second chambers, and operative in response to a reduction of fluid pressure in said fluid pressure conduit during a service brake application for terminating said venting of said third passages and for establishing fluid pressure communication of said second passage with said third and first passages to thereby exert a fluid pressure force on said second piston abutment to effect movement of said tandem-connected piston abutments from said brake release position to a brake application position in opposition to said release spring, and for subsequently interrupting said communication of said second passage with said third and first passages and venting said second passage to establish a braking force corresponding to the resultant fluid pressure differential between said first and second chambers.

37. A brake cylinder device, as recited in claim 36, further comprising:
 (a) a cover member fixed to said main body so as to enclose said second cylinder in spaced relationship therewith to provide a fifth chamber in which fluid under pressure is stored; and
 (b) said mounting boss further comprising a fifth passage having one end opening at said first face portion and the other end opening into said fifth chamber, said valve means being further operative in response to an increase of pressure in said fluid pressure conduit for establishing fluid pressure communication between said fourth and fifth passages to provide said stored fluid under pressure in said fifth chamber, and operative in response to a reduction of fluid pressure in said fluid pressure conduit during an emergency brake application for interrupting said communication of fluid pressure between said fourth and fifth passages and for establishing fluid pressure communication between said fifth and said third passages, whereby said braking force during said emergency brake application is greater than during said service brake application.

38. A brake cylinder device, as recited in claims 21, 31, or 35, wherein said openings through said first and said second end walls are coaxial.

39. A brake cylinder device, as recited in claims 16, 31, or 35, further comprising third seal means for effecting a fluid pressure seal between said first and second chambers.

40. A brake cylinder device, as recited in claim 39, wherein said first, second, and third seal means comprise packing cup type pressure seals.

41. A brake cylinder device, as recited in claim 31, wherein said one and said other sides of said first piston abutment have equal effective pressure areas subject to the fluid under pressure stored in said first and second chambers.

42. A brake cylinder device, as recited in claims 16, 31, or 35, wherein said first piston abutment further includes means for guidably supporting said first piston abutment in said first cylinder.

43. A brake cylinder device as recited in claim 19, wherein said one and said other sides of said first piston abutment have equal effective pressure areas subject to the fluid under pressure stored in said first and second chambers.

* * * * *